July 21, 1959  S. G. HARRIS  2,895,162
MACHINE FOR RECOVERING MEAT FROM ANIMAL CARCASSES
Filed Nov. 8, 1957  2 Sheets-Sheet 2

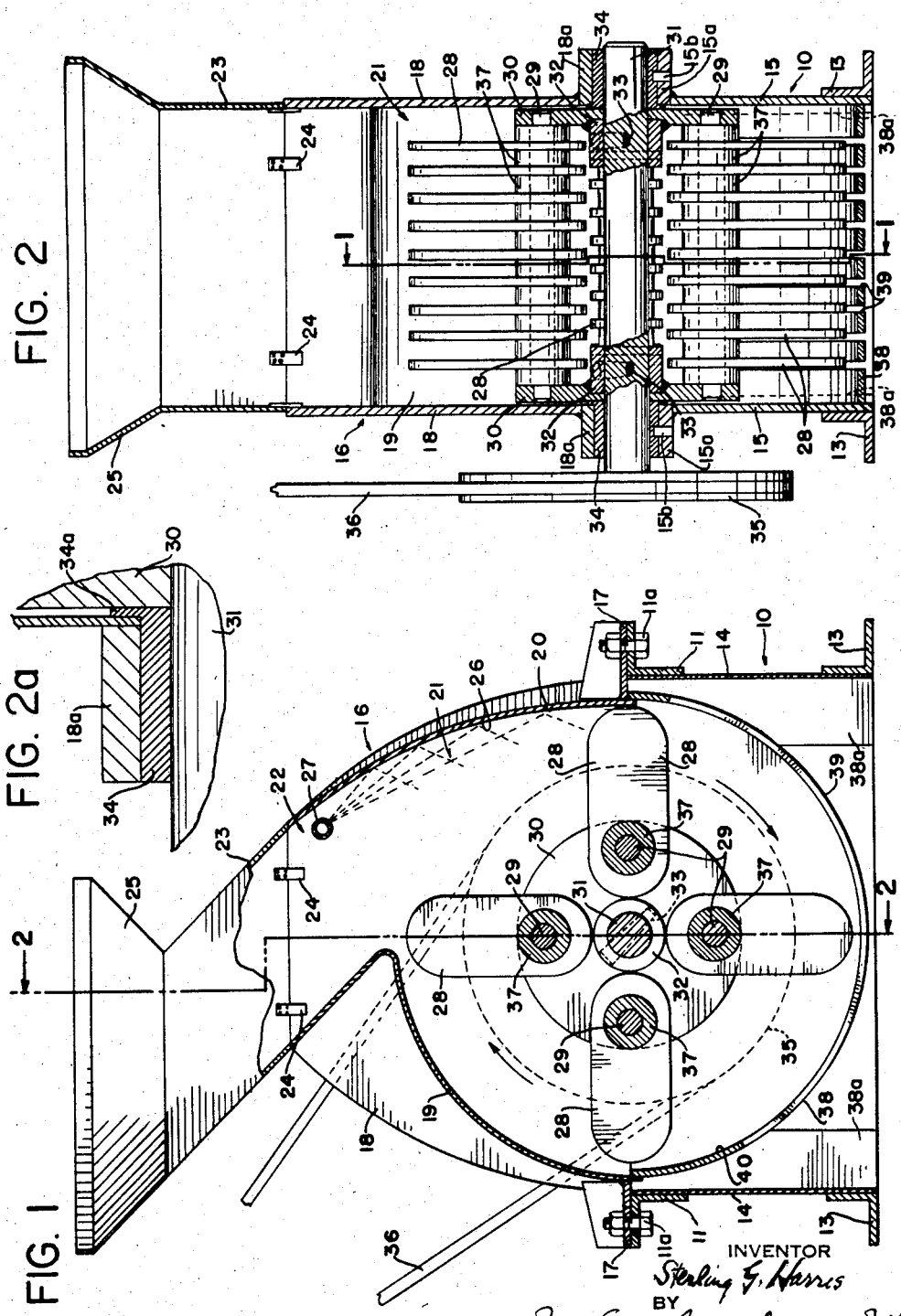

United States Patent Office 2,895,162
Patented July 21, 1959

2,895,162

MACHINE FOR RECOVERING MEAT FROM ANIMAL CARCASSES

Sterling G. Harris, Beaufort, S.C., assignor to The Blue Channel Corp., Port Royal, S.C., a corporation of Maryland Application November 8, 1957, Serial No. 695,359

7 Claims. (Cl. 17—1)

This invention relates to the recovery of the meat from the carcasses of animals, such as poultry, crabs, fish, etc., as a preliminary to canning the meat, packing it for shipment in refrigerated or frozen condition, or utilizing it as an ingredient of a food product. More particularly, the invention is concerned with a novel machine for recovering the meat from animal carcasses, which is highly efficient, of simple inexpensive construction, easily maintained in sanitary condition and good working order, and operable by workers of little training or skill.

The machine is constructed to subject animal carcasses or parts thereof to impact action to break up the carcasses or parts to a greater or less extent and free the meat from the bony material. The impact effect is obtained by striking the material fed into the machine a severe blow to cause the material to travel at high velocity and the material is then abruptly stopped by impingement against a fixed surface. Following the impact, the material is screened under pressure and, for this purpose, the material is advanced over a stripping plate having slots extending in the direction of travel of the material. The plate is curved so that the material traveling along it is subjected to centrifugal force tending to press the material through the slots and thereby cause it to be stripped from the bones or shell parts. Any material, which does not pass the stripping plate, is then subjected to an impact and stripping in successive cycles, until all the material has passed through the plate.

For a better understanding of the invention, reference may be made to the accompanying drawings, in which Fig. 1 is a view of the machine, partly in side elevation and partly in section, on the line 1—1 of Fig. 2;

Fig. 2 is a sectional view on the line 2—2 of Fig. 1;

Fig. 2a is a view of a part of Fig. 2 on an enlarged scale;

Figure 3:
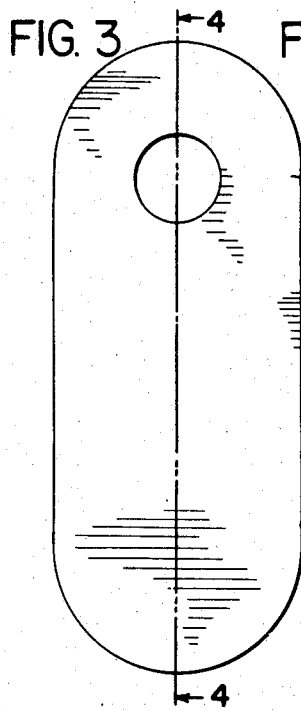
Fig. 3 is a side elevational view of one form of impeller used in the machine.
Figure 4:
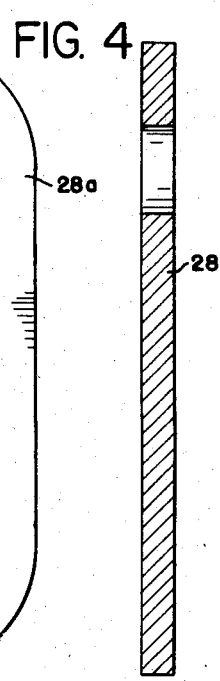
Fig. 4 is a sectional view on the line 4—4 of Fig. 3.
Figure 5:
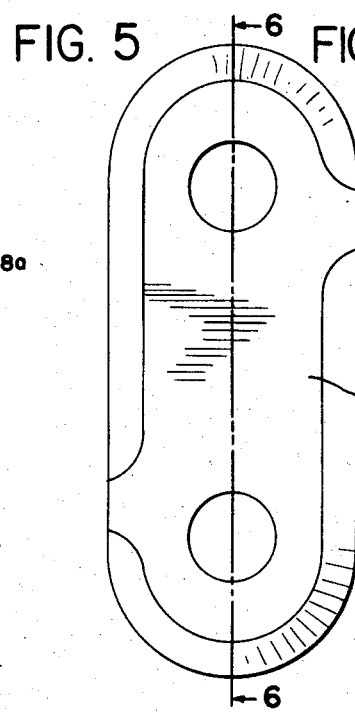
Fig. 5 is a side elevational view of another form of impeller.
Figure 6:
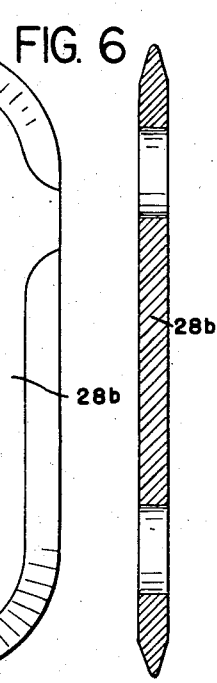
Fig. 6 is a sectional view on the line 6—6 of Fig. 5.
Figure 7:
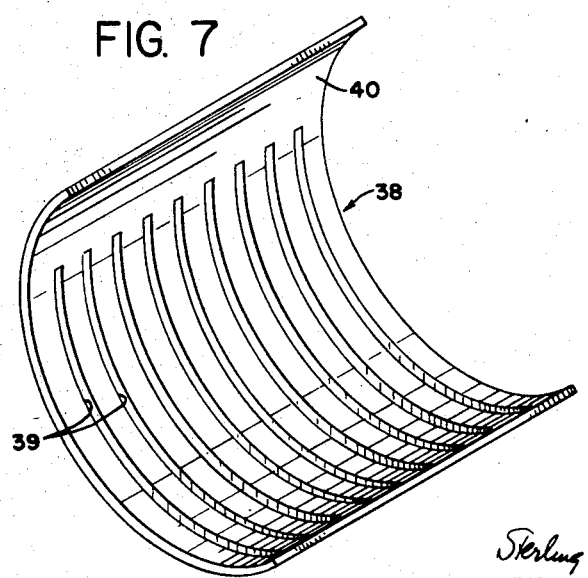
Fig. 7 is a view in perspective of a stripping plate used in the machine.

The apparatus in the form shown comprises a casing, which includes a lower section 10 generally rectangular in cross-section and having an open top and an open bottom forming a discharge opening. The section 10 is provided with transverse end flanges 11 made of angle irons and means at its lower end, such as the angle irons 13 extending across its end and side walls 14, 15, for mounting the apparatus on a support above a receptacle. The casing has an upper section 16, which is provided at its lower end with transverse end flanges 17 adapted to rest upon flanges 11 and to be secured thereto by any suitable means, such as the bolts 11a. The upper casing section has flat parallel side walls 18 connected by curved walls 19, 20 formed to define the top of a chamber 21, from which a feed chute 22 extends upwardly at an angle to the vertical. The chute may have an extension 23 resting upon the upper end of the chute and held in place by lugs 24 projecting from its lower end and receivable in the upper end of the chute. The extension 23 ordinarily has a flaring peripheral flange 25 at its upper end.

The curved wall 20 of the upper casing section has a portion extending substantially vertically and having a smooth inner area providing an impact surface 26. In the operation of the machine, the impact surface may be cleaned from time to time by liquid sprayed upon it by means of a pipe 27 with jet openings, which projects through one side wall of the chute 22 and extends toward the opposite wall.

Within the chamber 21, a plurality of impellers 28 are pivotally mounted in sets on rods 29 supported at an angular spacing of 90° in spaced discs 30 mounted on a shaft 31. The discs carry collars 32 secured to their opposed faces by welding and formed with diametrical tapered openings alignable with diametrical tapered bores through the shaft. The discs and shaft are secured together by tapered pins 33 lying in the openings and bores and the shaft is mounted for rotation in a pair of bearing bushings 34 supported in upper and lower semi-cylindrical bearing housings 15a, 18a secured by welding in openings in the side walls 15, 18, respectively, of the lower and upper sections of the casing. Each bearing bushing is held against rotation in its housings by a pin 15b, which is mounted in an opening in the lower housing 15a and extends into a bore in the bushing. Each bushing 34 has a radial flange at its inner end, which lies between the discs 30 on the shaft and the side walls 15, 18 and the bearing housings 15a, 18a and acts as a thrust washer. At one end, the shaft carries a pulley 35, about which a driving belt 36 is trained.

The impellers 28 are flat metal plates having an opening near one end, so that they may be slipped on the rods 29 with spacers 37 between adjacent impellers and between the end impellers of the set and the discs 30. The spacers are of such thickness that the impellers are evenly spaced and those on one rod lie opposite the spaces between the impellers on the adjacent rods. Accordingly, two of the rods diametrically disposed carry an even number of impellers and the other two rods carry an odd number. The impellers have rounded ends and may have a length of about 5", a width of about 2", and a thickness of about 1/4". In a machine suitable for operating on seafood, such as the carcasses of crabs, pieces of fish, etc., adjacent impellers are spaced 1/4" to 1/2", while, in a machine for operating on poultry, adjacent impellers are spaced 1/2".

A semi-cylindrical stripping plate 38 is mounted in the lower casing below the shaft 31 and out of the path of the impellers carried thereby. For supporting the stripping plate, plates 38a are secured by welding to the inner faces of the side walls 15 of the lower section of the casing adjacent the end walls 14 and the upper ends of the plates are formed with curved surfaces conforming to the curved lower surface of the stripping plate. When the stripping plate is in operative position, it rests upon the upper ends of the supporting plates with one end lying against the under side of the flange 17 projecting from the wall 20 of the upper section 16 of the casing and its other end lying in slightly overlapping relation to the lower end of the curved wall 19 of the section 16. Upon removal of the upper section of the casing, the stripping plate can be removed by being lifted from the supporting plates.

The stripping plate 38 is formed with a plurality of parallel lengthwise slots 39 between its ends and, at the end of the plate adjacent the impact surface 26, the slots terminate relatively close to the end of the plate. At the other end of the plate, the slots terminate a substantial distance from the end of the plate to provide a solid area 40 lying approximately diametrically opposite the impact surface 26. The plate 38 is preferably about ¼" or somewhat thicker and has ribs separated by slots, the slots being of different width depending on the material being treated, as will be later explained.

For minimum shredding of the meat slots 39 of the stripping plate should be long in a direction parallel to the path of the impellers and uninterrupted. They should extend uninterrupted through an angular distance of at least 90° and preferably through an angular distance substantially greater than 90°.

In the use of the machine in operating on seafood, pieces of the seafood are given a preparation treatment varying with the kind of seafood. Thus, when the seafood is crabs, the crabs as delivered at the dock are cooked to coagulate and shrink the contents of the legs and claws and to shrink the meat within the body. The cooking is carried out in conventional equipment, such as retorts or steam boxes, and the cooking conditions vary with the condition and weight of the crabs from 5 to 15 minutes with a temperature between 240° F. to 250° F., a cook from 8 to 12 minutes at 250° F. being ordinarily best for crabs, the meat of which is commonly marketed iced, frozen, or canned. After the cooking, the crabs are chilled and the bodies are stripped by removal of the claws, legs, mouth parts, gills, viscera, fat, and apron. The stripped bodies and the legs and claws are the parts of the crabs, from which the meat is recovered, and the bodies and the legs and claws are put through the machine separately. When fish are to be processed, the head, tail, fins, scales, and viscera are removed from each fish and the stripped fish bodies are then cooked until the flesh shrinks from the bones. Thereafter, the cooked bodies are cooled to make the meat firm, as in the case of crabs, and the cooled bodies are ready for treatment.

In using the machine in operating on poultry, the carcasses fed to the machine have been drawn and the feathers, heads, and feet removed. The carcasses are then cooked until the meat begins to shrink from the bony material, following which the whole carcasses or parts thereof, such as the breasts, legs and thighs, backs and necks, are put through the machine in separate operations.

In the operation of the machine, its shaft is driven at a speed within the range from 250 to 600 r.p.m. with 300 r.p.m. best for most purposes. At a higher speed of the impellers, the output and efficiency of the machine are low, while, if the speed is too high, the meat recovered is in smaller pieces. When the piece to be processed, such as the stripped body of a crab or a piece of a poultry carcass, is fed into the machine, the piece falls into the path of the impellers past their top dead center, is struck a severe blow by the impellers, and is caused to travel at high velocity across the bottom of the feed chute. The piece is then abruptly stopped by impingement upon the impact surface of the casing with the result that the impacts of the impellers against the piece and of the piece against the impact surface cause the piece to be broken up to a greater or less extent and the meat to be freed from the bones. The material is then screened by being advanced by the impellers over the surface of plate 38 and, as the material moves over the arcuate plate at relatively high speed, the material is subjected to centrifugal force tending to strip the meat from the bones or shell parts and to force the material through the openings in the stripping plate. Any material, which does not escape through the openings, is carried along the inner surface of the wall 19 of the upper casing section and again thrown violently against the impact surface 26. The material is again subjected to the stripping action and the cycle repeated until the material has passed through the plate openings.

In the treatment of crab claws and legs, the impellers 28a have smooth peripheral edges, while the impellers 28b employed for stripped crab bodies are preferably sharpened. The sharpened impellers 28b are preferably thinner than the impellers 28a, so that, in a machine requiring sets of eight and nine impellers 28a, sets of ten and eleven impellers 28b are used. The impellers 28b have openings near opposite ends so that their positions on a rod can be reversed when the sharpened edge at one end becomes dull.

The stripping plate slots vary in width depending on the material to be treated and in the case of crab claws and legs may have a width of ¼", ⁵⁄₁₆", or ⅜", depending on the size of the claws and legs. For operating on stripped crab bodies, the slots may have a width of ¼" to ½" with ⁵⁄₁₆" the best width for most purposes. For recovering the meat in large pieces, the larger slots within the stated range are used. The plate should have slots ¼" wide for processing bodies of fish weighing about 2 lbs., while, for larger fish, the slots may be ⅜" to ½" wide. For poultry breasts, the slots in the plate may be about 1¼" in width while, for boning legs and thighs, a plate with slots about ¾" wide is desirable. For boning wings, backs, and necks, the plate slots should be ¼" to ⁵⁄₁₆" wide and, when small pieces of meat are acceptable and whole carcasses of poultry are fed to the machine, a screen plate with slots ¼" to ⁵⁄₁₆" in width is desirable. In all cases, the ribs between adjacent slots are approximately ¼" wide.

The provision of the blank area 40 on the stripping plate 38 beyond the ends of the slots in the direction of travel of the material along the plate is advantageous in that accumulation of meat between the plate and the adjacent wall 14 of the casing is thereby prevented. As the plate approaches the casing wall, the space between the plate and wall decreases in thickness and, if the slots extended close to the end of the plate in the direction of travel of the material, pieces of meat and bony material forced through the slots would be wedged between the plate and wall and plug the slots. With the slots terminating well below the horizontal at one end as shown, the material passed through the slots is free to drop out the bottom of the casing and leave the slots open.

The mixture of meat and bony material issuing from the machine is best separated into its constituents by a flotation operation and, for this purpose, the mixture is discharged into a tank containing a brine of sufficient strength to float the meat while permitting the pieces of bony material to sink. If desired, the machine may be mounted above the tank and discharge directly into it. The meat separated from the bony material by flotation is in condition for packing as fresh meat, for canning or freezing, or for use as an ingredient in a cooked food product after being washed for removal of adhering brine.

The new machine can be easily maintained in sanitary condition, since it can be quickly dismantled. For this purpose, the upper casing section 16 is disconnected from the lower section and lifted off to expose the impellers. The pins 33 are then driven out of the openings in collars 32 and the bores in the shaft, after which the shaft is lifted out of its lower bearing sections and the discs 30 slipped off its ends. The spacers 37 and impellers 28 may then be slipped off the rods 29 and the parts cleaned and sterilized. Remounting of the parts of the impeller assembly is simple and the machine can be quickly restored to operating condition.

This application is a continuation-in-part of my copending application, Ser. No. 638,559, filed February 6, 1957 now abandoned.

I claim:

1. An apparatus for use in recovering the meat from animal carcasses or pieces thereof, which comprises a casing having a bottom discharge opening, a horizontal shaft within the casing, a plurality of impellers supported by the shaft for swinging movement on axes parallel to the shaft, a feed chute for introducing the material to be treated into the upper quadrant of the casing in front of the impellers, in the direction of their movement, at top dead center, the casing having a smooth inner impact surface in said quadrant, and a screen plate mounted in the casing between the shaft and the discharge opening and having slots extending in a direction parallel to the paths of the impellers, said slots having an uninterrupted angular length in said direction of at least 90°.

2. The apparatus of claim 1, in which the chute extends upwardly at an angle to the vertical with its top opening lying substantially at the opposite side of top dead center of the impellers from its lower opening.

3. The apparatus of claim 1, in which the impellers are arranged in sets pivotally mounted in spaced relation on rods carried by the shaft in parallel relation thereto.

4. The apparatus of claim 1, in which the impellers on each rod lie opposite the spacings between the impellers on the adjacent rods.

5. The apparatus of claim 1, in which a pair of discs are mounted on the shaft within the casing and held in place on the shaft by removable means, a plurality of rods are mounted in equiangularly spaced pairs of aligned openings in the discs, and the impellers are mounted on the rods with removable spacers between the end impellers and the discs and between adjacent intermediate impellers.

6. The apparatus of claim 1, in which the forward edge and outer end of each impeller is sharpened.

7. The apparatus of claim 1, in which the casing is made up of upper and lower sections separately secured together and the shaft is mounted in bearings secured to the outer faces of the side walls of the casing sections, each bearing being made up of upper and lower halves secured to side walls of the upper and lower casing sections, respectively.

References Cited in the file of this patent

UNITED STATES PATENTS

| | | |
|---|---|---|
| 1,240,261 | Sander | Sept. 18, 1917 |
| 2,319,629 | Poese | May 18, 1943 |
| 2,339,961 | Stevenson | Jan. 25, 1944 |
| 2,490,564 | Vincent | Dec. 6, 1949 |
| 2,617,600 | Cole | Nov. 11, 1952 |
| 2,635,298 | Lepkowski | Apr. 21, 1953 |